No. 865,392.  PATENTED SEPT. 10, 1907.
C. M. HOSE.
SCREW SEAT VALVE.
APPLICATION FILED FEB. 6, 1906.

WITNESSES,
J. C. Dynu
L. B. Woerner.

INVENTOR,
Chas M. Hose,
By Minturn & Woerner,
Attorneys.

THE NORRIS PETERS CO., WASHINGTON, D. C.

UNITED STATES PATENT OFFICE.

CHARLES M. HOSE, OF INDIANAPOLIS, INDIANA.

SCREW-SEAT VALVE.

No. 865,392.  Specification of Letters Patent.  Patented Sept. 10, 1907.

Application filed February 6, 1906. Serial No. 299,679.

*To all whom it may concern:*

Be it known that I, CHARLES M. HOSE, a citizen of the United States, residing at Indianapolis, in the county of Marion and State of Indiana, have invented certain new and useful Improvements in Screw-Seat Valves, of which the following is a specification.

This invention relates to improvements in valves for pipes for the conveyance of steam, water, gas or other liquids or fluids under pressure, and the object of the invention is to provide a valve-seat in which changes, due to wear, can be readily compensated for so as to secure a tight cut-off at all times.

Another object of the invention is to provide a seat in which a plurality of bearing surfaces will be brought into play when the valve is closed so as to insure a greater certainty of complete cut-off.

The object further is to provide a simple and durable construction which will be inexpensive to manufacture and equally as easy to operate as the cut-off valves heretofore in use.

Figure 1:
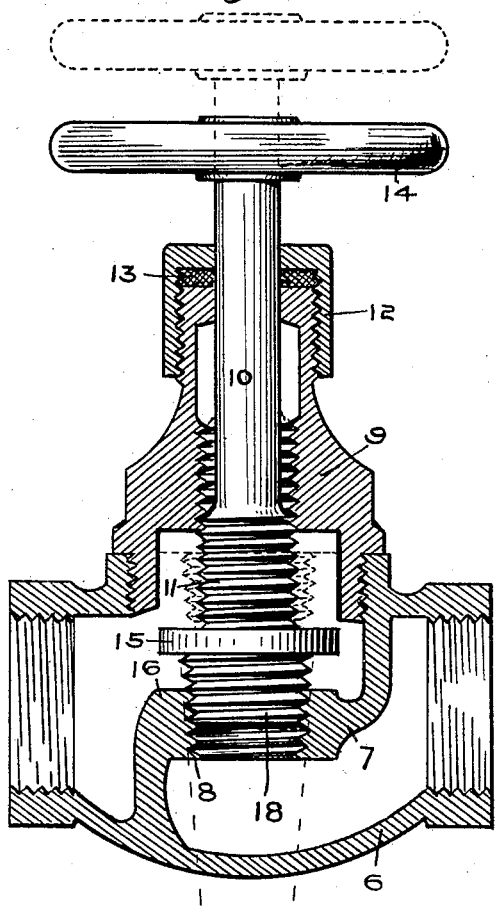
Figure 2:
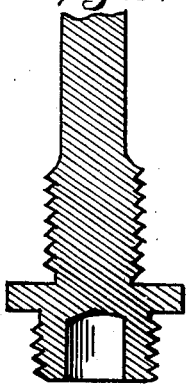

I accomplish the objects of the invention by the mechanism illustrated in the accompanying drawing, in which, Figure 1 represents my improved valve in vertical section on a plane passing longitudinally and centrally of the valve-body, and Fig. 2 a detail in vertical section of the lower end of the valve stem.

Referring to the drawing, 6 represents the body of my improved valve having the partition 7. Formed through this partition is the opening 8, within which the valve is seated.

9 is a cap which screws into a threaded opening in the top wall of the valve 6. This cap forms the closure to an opening into the valve of sufficient size to permit of the introduction there through of the interior operative parts of the device. The cap has an extension externally of the body of the valve through which extension is a hole radially of the valve-body to receive the valve-stem 10. The inner portion of this hole for the valve-stem is screw-threaded to receive the threaded portion 11 of the stem.

12 is a follower which screws upon the outer end of the cap 9 to form a stuffing box, and 13 is the stuffing or packing of soft fiber by means of which a tight joint is secured between the cap 13 and the stem. The outer end of the stem has the hand-wheel 14 by which the stem is rotated to secure the required adjustments of the valve.

15 is a flange extension from the stem at the inner end of the threaded portion 11, and is adapted, when the stem is screwed a sufficient distance in the valve, to form a seat upon the shoulder 16.

Thus far the construction is substantially the same as in valves heretofore made and used.

The principal feature of my invention consists in a continuation of the stem inwardly of the valve beyond the flange 15 as shown at 18. This extension tapers from the flange 15 toward the end of the extension and is screw-threaded in the manner clearly shown in the drawing.

The opening 8 in the partition 7 is made tapering and is also screw-threaded to conform to the taper and threads of the extension 18. The relative size of opening 8 and extension 18 are such that, when the valve is new, these parts will be so tight when about three threads of the extension 18 have been screwed into the hole 8 that said extension cannot be further introduced into the opening. The drawing shows the condition here mentioned, in which it will be seen that the seating of the valve is not on any one thread, but is on several threads. The dimensions of the parts are such that the thread next outside of the opening 8 will not enter the opening until after the threads nearer the end of the extension 18 are worn to such an extent as to admit the extension 18 that much further. When the valve is so worn that the thread next to the flange 15 on said extension 18 reaches the top thread of the hole 8, the flange 15 will be seated on the shoulder 16, thereby making an entirely new closure. Any liquid would be compelled to pass the threads of the extension 18 before it could reach the closure formed between the said flange and shoulder. When this last condition obtains a tighter closure is secured for the valve by just so much as is secured by the addition of the threaded extension 18 in the threaded hole 8, and until the thread of these parts are worn so as to permit the flange 15 and shoulder 16 to meet, a perfectly tight joint will be secured by screwing the tapering extension 18 into the tapering hole, and as these parts become worn, the extension 18 can be readily forced in a little bit farther to compensate for this wear.

The threads 11 on a stem 10 are always in engagement with the threads of cap 9, and therefore the strain on the threads of the valve-seat is in a large measure relieved.

The metal in the extension 18 is removed from the end of the extension in approximately as far as the threads extend on the outside of that part so as to leave walls of about the same thickness as the walls surrounding the opening 8. The purpose of this is to make the expansion of the extension 18 as near as possible the same as that of the walls of the valve-seat so as to keep the valve from becoming tight and inoperative due to this cause, as will be the case were the extension 18 left solid.

Having thus fully described my invention, what I claim as new and wish to secure by Letters Patent, is—

1. A valve-body having a screw-threaded tapering opening to form a valve-seat, and a stem having an annular flange adapted to be seated on the valve-seat, said stem also having a screw-threaded tapering end below the flange to screw into the threaded seat and form a closure, said extension being recessed from its end, approximately as far in as the threads extend on its outside, to form walls of approximately the same thickness as the walls of the valve-seat, said valve-body having a recess to form a seat for the flange when the valve is open to assist in preventing leakage around the stem.

2. A valve-body divided into two compartments by a partition, said partition having a plane surface, a tapering screw-threaded hole through the partition in said plane surface, a valve stem having a tapering screw-threaded inner end and a flange above said threaded portion adapted to bear upon the plane surface when the said threaded end of the stem is screwed fully into the tapering hole, said threaded end being recessed in from its outer end to the depth of the outside thread to form walls of approximately the same thickness as the walls of the valve-seat, said stem being threaded above the flange, said valve-body having an opening, a cap screwed into said opening, said cap having a threaded opening to receive the threaded portion of said stem, and said cap opening being enlarged at its inner end to receive the flange of the stem with a close fit, said flange when the valve is open making a tight fit against the end of said enlargement.

In witness whereof, I, have hereunto set my hand and seal at Indianapolis, Indiana, this, 31st day of January, A. D. one thousand nine hundred and six.

CHARLES M. HOSE. [L. S.]

Witnesses:
CLINTON J. PARKER,
J. A. MINTURN.